(12) United States Patent
Boileau et al.

(10) Patent No.: US 11,834,187 B2
(45) Date of Patent: Dec. 5, 2023

(54) DRIVE UNIT FOR AN AIRCRAFT HAVING LIFTING POINTS, AND CARRIAGES FOR SUPPORTING SUCH A UNIT

(71) Applicants: Safran Nacelles, Gonfreville l'Orcher (FR); Safran Aircraft Engines, Paris (FR)

(72) Inventors: Patrick Boileau, Gonfreville l'Orcher (FR); Bruno Beutin, Moissy-Cramayel (FR)

(73) Assignees: Safran Nacelles, Gonfreville l'Orcher (FR); Safran Aircraft Engines, Paris (FR)

( * ) Notice: Subject to any disclaimer, the term of this patent is extended or adjusted under 35 U.S.C. 154(b) by 777 days.

(21) Appl. No.: 16/998,893

(22) Filed: Aug. 20, 2020

(65) Prior Publication Data

US 2020/0377221 A1 Dec. 3, 2020

Related U.S. Application Data

(63) Continuation of application No. PCT/FR2019/050380, filed on Feb. 19, 2019.

(30) Foreign Application Priority Data

Feb. 20, 2018 (FR) ...................................... 18/51445

(51) Int. Cl.
*B64D 29/06* (2006.01)
*B64F 5/50* (2017.01)
(Continued)

(52) U.S. Cl.
CPC ............. *B64D 29/06* (2013.01); *B64D 27/26* (2013.01); *B64F 5/50* (2017.01); *F02K 1/70* (2013.01);
(Continued)

(58) Field of Classification Search
CPC .. B64D 29/06; B64D 27/26; B64D 2027/262; B64D 2027/266; F02K 1/70;
(Continued)

(56) References Cited

U.S. PATENT DOCUMENTS

| 2010/0314198 A1 | 12/2010 | Vauchel et al. |
| 2015/0316197 A1 | 11/2015 | Morey et al. |
| 2016/0160799 A1 | 6/2016 | Gormley |

FOREIGN PATENT DOCUMENTS

| EP | 2848536 | 3/2015 |
| FR | 2936493 | 4/2010 |

(Continued)

OTHER PUBLICATIONS

International Search Report for International Application PCT/FR2019/050380, dated May 22, 2019.
(Continued)

*Primary Examiner* — Benjamin P Lee
(74) *Attorney, Agent, or Firm* — Burris Law, PLLC

(57) ABSTRACT

A drive unit includes an engine such as a turbofan engine and a nacelle which includes, on the outside around an annular stream of fresh air, starting from upstream, an air inlet, front side covers, a thrust reverser having reversal gratings and movable rear covers. The front side covers surround the reversal gratings of the thrust reverser when it is closed, and the movable rear covers retreat with said gratings to open the reverser. The engine includes lifting points that form heavy-duty attachment points intended to receive handling clevis for lifting and transporting the drive unit. The lifting points are two upper lifting points arranged on the engine, each on one side of the engine radially behind the front side covers above the horizontal diameter (D) of the drive unit.

15 Claims, 4 Drawing Sheets

Figure 1:
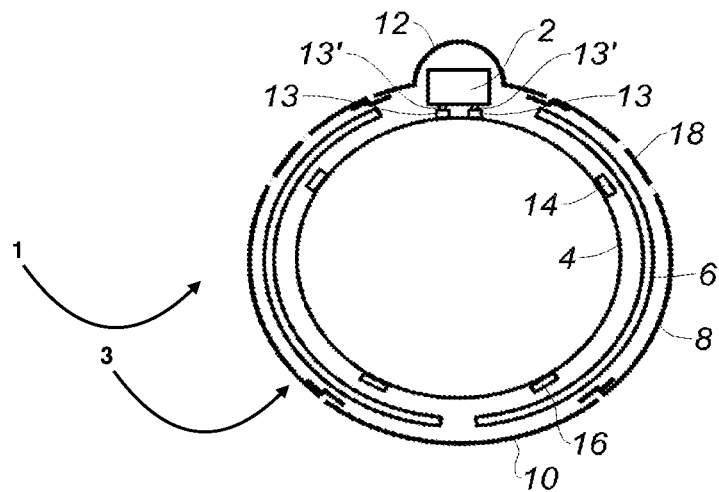

(51) Int. Cl.
 *B64D 27/26* (2006.01)
 *F02K 1/70* (2006.01)
 *F02K 1/76* (2006.01)

(52) U.S. Cl.
 CPC ........ *F02K 1/763* (2013.01); *B64D 2027/262* (2013.01); *F05D 2220/323* (2013.01); *F05D 2260/02* (2013.01)

(58) Field of Classification Search
 CPC ........... F05D 2220/323; F05D 2260/02; F05D 2240/90; B64F 5/50; F02C 7/20
 See application file for complete search history.

(56) References Cited

FOREIGN PATENT DOCUMENTS

| | | |
|---|---|---|
| RU | 2007345 | 2/1994 |
| RU | 801460 | 1/1996 |
| RU | 2466067 | 11/2012 |
| WO | 2015114276 | 8/2015 |

OTHER PUBLICATIONS

Search Report appended to Decision to Grant in RU Application No. 2020126683, completed May 12, 2022, 2 pages.

DRIVE UNIT FOR AN AIRCRAFT HAVING LIFTING POINTS, AND CARRIAGES FOR SUPPORTING SUCH A UNIT

CROSS-REFERENCE TO RELATED APPLICATIONS

This application is a continuation of International Application No. PCT/FR2019/050380, filed on Feb. 19, 2019, which claims priority to and the benefit of FR 18/51445 filed on Feb. 20, 2018. The disclosures of the above applications are incorporated herein by reference.

FIELD

The present disclosure relates to a drive unit for an aircraft, comprising a motor such as a turbojet engine and a nacelle equipped with a cascade thrust reverser, as well as a handling carriage for this unit.

BACKGROUND

The statements in this section merely provide background information related to the present disclosure and may not constitute prior art.

Turbojet engines for motorizing aircraft disposed in a nacelle, receive fresh air from the front side, and reject, on the rear side, the hot gases from the combustion of the fuel delivering a thrust.

For the bypass turbojet engines, fan blades disposed around the motor generate a significant secondary flow of cold air along an annular flow path passing between this motor and the nacelle, which adds a high thrust.

Some nacelles include a thrust reverser system which at least partially closes the annular flow path of cold air, and rejects the secondary flow radially outwardly by directing it forward in order to generate a braking reverse thrust of the aircraft.

A known cascade thrust reverser type, presented in particular by the document U.S. Publication No. 201610160799A1, includes thrust reverser cascades forming a ring disposed under front cowls, surrounding the annular flow path, which are connected to rear movable cowls sliding rearwardly under the effect of cylinders In a closed position of the thrust reverser for a direct flow, the rear movable cowls close outward lateral passages disposed around the annular flow path.

In an open position of the thrust reverser for a reverse flow, the rear cowls operated by cylinders move back on longitudinal guides, by driving the cascades which are positioned in the lateral air passages. Closing flaps at least partially close the secondary flow rearwardly of these passages, by conveying the flow towards the cascades which reverse the thrust.

In this case, the outer surface of the nacelle is composed, from the front, of an upstream section comprising the air inlet, then a middle section surrounding the fan, having removable front cowls for maintenance, and then a rear or downstream section covered by the movable cowls of the thrust reverser.

The front cowls covering the circumference of the nacelle, may include in particular lateral cowls, a bottom cowl, and a top cowl disposed in the continuity of a cowling of the suspension mast of the turbojet engine. The suspension mast allows the motorization to be suspended from a wing of the aircraft.

Furthermore, the motor includes suspension points generally disposed at 12 o'clock, which are configured to receive suspension clevises allowing fastening the suspension mast to the motor.

The different front cowls include disassembly systems allowing them to be completely rotated or removed in order to access the elements in the nacelle, in particular the motorization, for maintenance operations. Moreover, the motorization includes lifting points disposed on the periphery thereof, forming resistant hooking points receiving handling clevises allowing lifting and transporting the complete motorization with the nacelle thereof.

A known transport carriage type, presented in particular by the document U.S. Publication No. 201510316197A1, includes on each side a fastening arm mounted on a pivot disposed in the longitudinal direction of the motorization. The two arms diverge outwarly from the carriage to leave room therebetween in order to lower the nacelle including the motorization, on which front cowls have been removed in order to release the lateral lifting points from the turbojet engine. Then these two arms are closed on the nacelle, by engaging a shaft fastened at the end of each arm on one of these lifting points which is disposed at three o'clock or at nine o'clock.

After locking the arms, a suspension of the turbojet engine with the nacelle thereof is obtained at two diametrically opposed lateral points, disposed in a horizontal direction, which maintain a balance of the motorization.

A drawback of these motorizations is that it is desirable there be a significant time to disassemble front cowls allowing clear sufficiently large areas in front of the lifting points.

In addition, the lifting and transport structures, such as the transport carriage presented above, occupy a lateral space which extends beyond the width of the nacelle, in order to have the arms coming on the sides of this nacelle to take the lateral lifting points. This occupied width poses handling and transport issues that are all the more important as the modern motorizations tend to increase the rate of dilution by the fan, which results in a larger diameter of this fan, and more widely spread arms.

SUMMARY

This section provides a general summary of the disclosure and is not a comprehensive disclosure of its full scope or all of its features.

The present disclosure addresses these and other drawbacks of the prior art.

In one form, the present disclosure includes a drive unit including a motor, such as a bypass turbojet engine, and a nacelle comprising on the outside around an annular flow path of fresh air, from the upstream, an air inlet, front cowls surrounding thrust reverser cascades of a thrust reverser when it is closed, and movable rear cowls which move back with the thrust reverser cascades to open the thrust reverser. The motor further includes lifting points provided to support it that are radially behind the lateral front cowls two upper lifting points each installed on one side of the nacelle, which are both disposed above the horizontal diameter of this nacelle.

The lifting points form resistant hooking points intended to receive handling clevises allowing lifting and transporting the drive unit.

Thus, the drive unit includes a motor such as a bypass turbojet engine, and a nacelle comprising on the outside around an annular flow path of fresh air, from the upstream, an air inlet, lateral front cowls, a thrust reverser comprising thrust reverser cascades and movable rear cowls, the lateral front cowls surrounding the thrust reverser cascades of the thrust reverser when it is closed, and the movable rear cowls moving back with these cascades to open the thrust reverser. The motor includes lifting points forming resistant hooking points intended to receive handling clevises allowing lifting and transporting the drive unit. The lifting points are two upper lifting points disposed on the motor, each on one side of the motor radially behind the lateral front cowls, above the horizontal diameter of the drive unit.

Due to the arrangement of the lifting points above the horizontal diameter, the drive unit of the present disclosure provides that, after having released the lifting points disposed behind the front cowls, in particular by opening hatches formed in these cowls, a handling clevis can be installed on each point receiving a reclaimer boom that comes from the top or the rear, but without projecting laterally from the horizontal outside diameter of the nacelle. An overall width size of the lifting or handling structure is obtained which is less than or equal to the width of the nacelle, which facilitates the transports of this unit.

The drive unit according to the present disclosure may include one or more of the following features, which can be combined with each other.

The drive unit includes suspension points to a mast.

In one form, each lateral front cowl includes a hatch which is removable and movable between a closed position in which the hatch is flush with said cowl and an open position in which the hatch opens the access to an upper lifting point, disposed radially outwardy of the upper lifting point on its side. Each removable hatch is configured to be open to provide access to the upper lifting points for handling the drive unit. In this manner, the removal of complete front cowls is inhibited for handling the drive unit. The removable hatches are hatches capable of being open and can be for example sliding or pivoting hatches or hatches capable of being removed from the cowls.

As used herein, the term "removable" means sliding, pivoting or capable of being at least partially removed.

The drive unit includes a handling clevis fastened on each upper lifting point when the removable hatches are open and the thrust reverser is open.

In one form, each upper lifting point is disposed in a transverse plane inside an angular sector centered on the axis of the nacelle, comprised between 20 and 40° above the horizontal diameter of this nacelle. With this angle, the lifting forces are distributed on each side of the nacelle, by allowing the installation of handling clevises on the lifting points directed radially outwardly, which do not project from the transverse space requirement of the nacelle.

In another form, the nacelle includes a lower front cowl and the motor such that the turbojet engine includes two lower support points each disposed radially behind the lower front cowl.

The present disclosure also provides a carriage for a drive unit comprising any one of the preceding features. In one form, the carriage is configured to have, in the transverse direction, a total width less than the maximum width of the drive unit. In this manner, the carriage may not increase the width of the nacelle during the transport thereof.

The carriage therefore has, in the transverse direction, a total width less than the maximum width of the drive unit.

According to one embodiment, the carriage includes, on each side, a hinged arm including a lower portion connected by a pivot to the base of the carriage, and an upper portion including a bearing point which is fastened on an upper lifting point.

According to another embodiment, the carriage includes on each side an upright disposed rearwardly of the lateral front cowls, connected, in the upper portion, to an upper lifting point.

In one form, each upright includes rearward in the longitudinal direction, a strut bearing on the base of the carriage behind this upright.

In another form, each upright includes forward in the longitudinal direction, in the upper portion, arms extended forward, connected, at the front ends thereof, to an upper lifting point.

In another form, the hinged arms or the uprights can be disassembled.

In addition, the carriage may include an upstream transport transverse lower cross-member, which is fastened under lower support points of the motor, in particular of the turbojet engine.

In one form, the carriage comprises bearing points for the upper lifting points and/or the lower support points. It includes, between these bearing points, a connection allowing taking up clearances due to differences in geometry between that of the motor and that of this carriage.

The present disclosure also relates to a motor transport assembly, comprising a drive unit and a carriage carrying the drive unit comprising any one of the preceding features.

According to one feature, the carriage includes on each side a hinged arm or an upright being connected to one of the upper lifting points via a handling clevis fastened on this upper lifting point.

Further areas of applicability will become apparent from the description provided herein. It should be understood that the description and specific examples are intended for purposes of illustration only and are not intended to limit the scope of the present disclosure.

DRAWINGS

Figure 9:
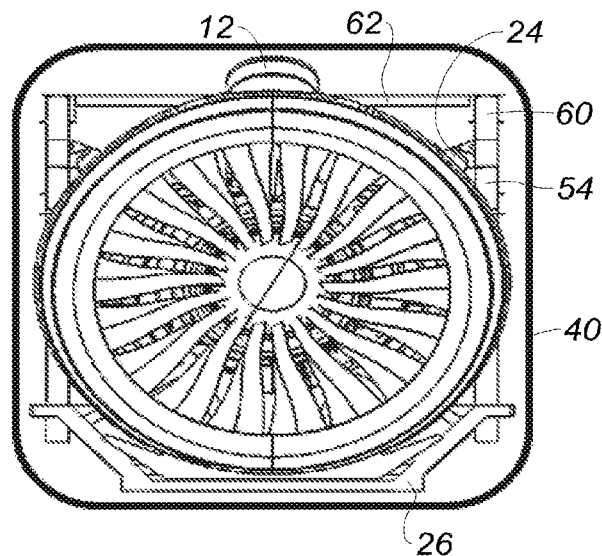
Figure 10:
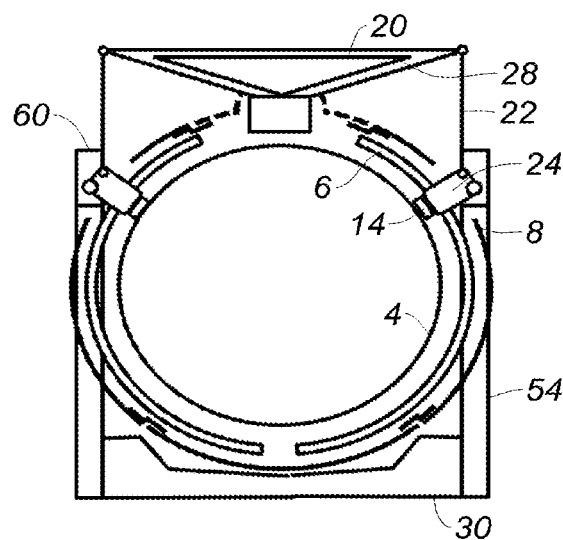

In order that the disclosure may be well understood, there will now be described various forms thereof, given by way of example, reference being made to the accompanying drawings, in which:

FIG. 1 is a cross-sectional diagram of a drive unit along a sectional plane passing through lifting and support points disposed behind front cowls according to the present disclosure;

FIGS. 2, 3, 4, and 5 show, in the same sectional plane, different steps of using a first type of carriage adapted for the drive unit;

FIGS. 6, 7, 8 and 9 show successively in side cross-section, in front view with a small inclination and in front view, a second type of carriage adapted for this drive unit; and FIG. 10 shows, in cross-section, a variant of this second type of carriage not comprising a lower transport beam.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a drive unit 1 having a nacelle 3 containing a bypass turbojet engine 4 supported by a mast 2 disposed at 12 o'clock.

To this end, the turbojet engine comprises suspension points 13 configured to receive suspension clevises 13' allowing fastening the turbojet engine to the mast 2.

Each side of the turbojet engine 4 is surrounded by a set of thrust reverser cascades 6, which in a closed position of the thrust reverser lies radially behind front cowls 8, 10 forming the aerodynamic outer surface of the nacelle 3.

The front cowls include, symmetrically relative to a vertical axis, lateral cowls 8 covering a large portion of the sides, a lower cowl 10, and an upper cowl 12 comprising an aerodynamic cowling in the extension of a suspension mast 2 fastened under an aircraft. The outer contour of the turbojet engine 4 comprises lifting points 14 and support points 16 firmly fixed to this turbojet engine to support its mass, and disposed respectively in the upper portion clearly above a horizontal diameter, in positions about 60 and 300°, also called 2 o'clock and 10 o'clock positions, and in the lower portion in positions about 145 and 215°, close to the 5 o'clock and 7 o'clock positions. These lifting points are distinct from the fastening points described above. The lifting points are distinguished by the fact that they are dimensioned to transmit loads lower than those of the suspension points. As will appear later in the description, these lifting points have a role during the static maintenance phase of the motor and as such the forces which will pass through these points are much lower than those which pass through the suspension points in the phase of using the drive unit.

By definition, and in a conventional manner per se, the lifting points 14 are capable of receiving handling clevises 24 (FIG. 2) allowing lifting and transporting the complete motorization with the nacelle 3 thereof. The handling clevises 24 in one form are inserts intended to be removed once the drive unit 1 is fastened to the suspension mast 2 at the suspension points 13.

Each lateral cowl 8 comprises in the upper portion a hatch 18 which is removable and movable between a closed position in which the hatch is flush with said cowl and an open position in which the hatch opens the access to an upper lifting point 14, disposed radially in front of an upper lifting point 14. The removable hatch is adapted to be completely removed from the lateral cowl 8. The lower support points 16 are disposed behind the lower cowl 10.

In this manner, by quickly opening the removable hatches 18, representing small elements which are easy to be stored, the upper lifting points 14 are accessed. In particular the lifting points 14 and the support points 16 represent resistant fasteners which can receive technical elements applying forces, such as cylinders for displacing the thrust reverser cascades 6, the removable hatches 18 which are oppositely disposed then facilitate maintenance work on these technical elements.

Figure 2:
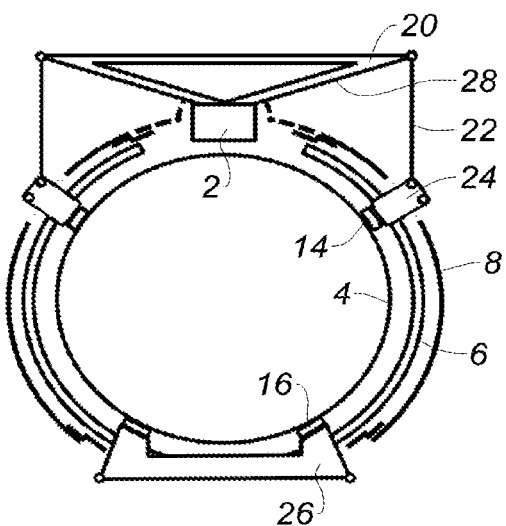

FIG. 2 shows after opening the hatches 18 without removing the lateral cowls 8, and opening the thrust reverser to move back the cascades 6 thereof in order to release the lifting points 14 located behind, the fastening of a handling clevis 24 on each lifting point 14. Similarly the lower cowl 10 is removed to fasten a lower transverse transport beam 26 on the two lower support points 16.

A lifting tackle 20 fastened to the mast 2 of the aircraft, includes on each side an arm 28 extending in the width, having one end coming above the handling clevis 24, to receive a suspension cable 22 fastened to this clevis.

Figure 3:
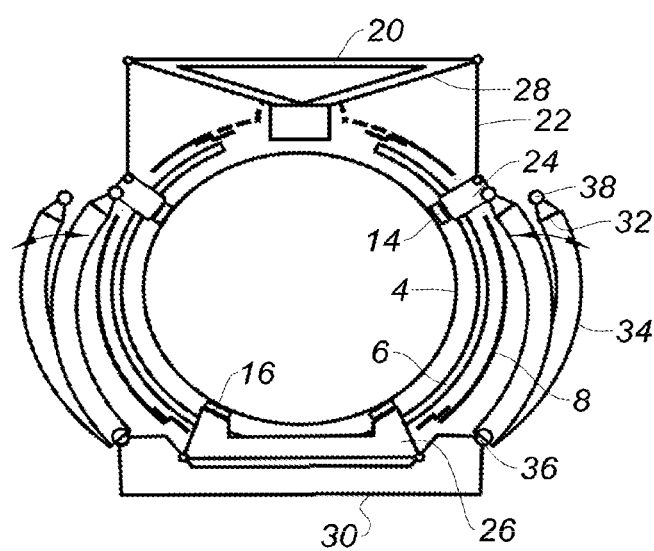

FIG. 3 shows a transport carriage 30 including on each side a hinged arm 34 which pivots in a transverse plane thanks to a pivot 36 disposed at its base, having a longitudinal axis fastened on the side of the carriage.

The hinged arm 34 includes a lower portion connected by the pivot 36 to the base of the carriage 30, and an upper portion 32 including a bearing point 38 which is fastened on an upper lifting point 14.

By spreading out the two hinged arms 34, a space available is cleared between these arms for moving the carriage 30 forward and disposing it under the nacelle. Then the two arms 34 are brought closer towards the axis of the nacelle, to adjust on each side an upper anchoring point of this arm on the handling clevis 24, then to be fastened thereon using a quick locking system.

The lifting tackle 20 can then be detached from the handling clevises 24, in order to take the carriage 30 placed on displacement wheels, with the complete motorization system which has undergone a minimum of disassembly of the front cowls thereof.

Figure 4:
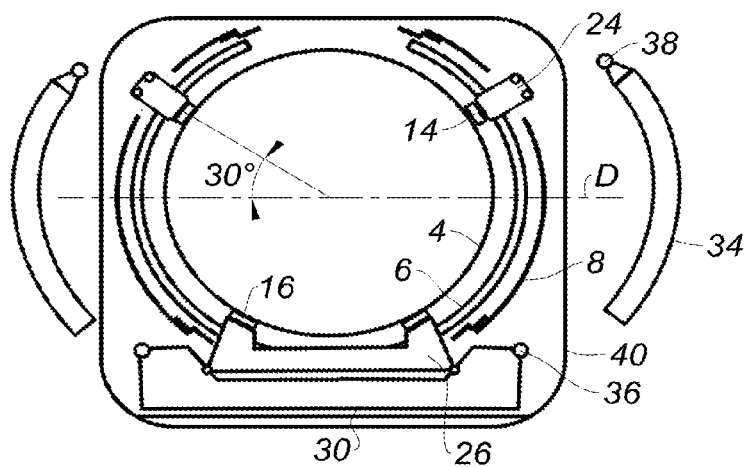

FIG. 4 shows the handling carriage 30 then brought, supporting the drive unit, after the removal of the hinged arms 34 thereof by detaching the pivots 36 holding these arms on the carriage, which includes a minimum transverse space desirable for allowing it in particular to enter a minimum passage section 40. This passage section 40 may in particular represent the passage section of a cargo door of an aircraft, a container or a truck trailer.

During the displacement of the handling carriage 30, the hinged arms 34 are taken with it, in order to fasten them again on this carriage during subsequent operations.

It should be noted that the handling clevises 24 disposed clearly above the horizontal diameter D of the nacelle, in an angular sector centered on the axis of the nacelle, comprised between 20 and 40° above this diameter, in particular at an angle of 30°, can project outside the contour of this nacelle without going beyond the total width thereof.

Figure 5:
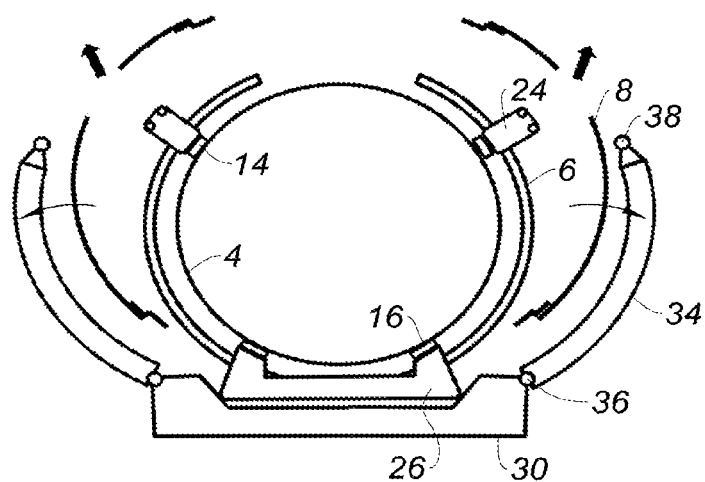
Figure 6:
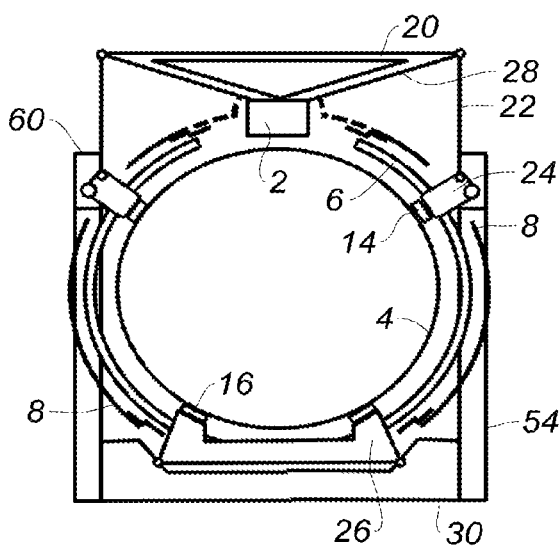

FIG. 5 shows that the removal of the lateral panels 8 of the nacelle is possible in order to perform maintenance operations behind these panels, which can be done with the hinged arms 34 remaining in place on the carriage 30, by spreading them out only, which reduces the disassembly operations.

The opening of the arms 34 is sufficient to allow spreading out the lateral panels 8 freeing them from the handling clevises 24, then displacing these panels upwards or in the longitudinal direction to take them out.

Figure 7:
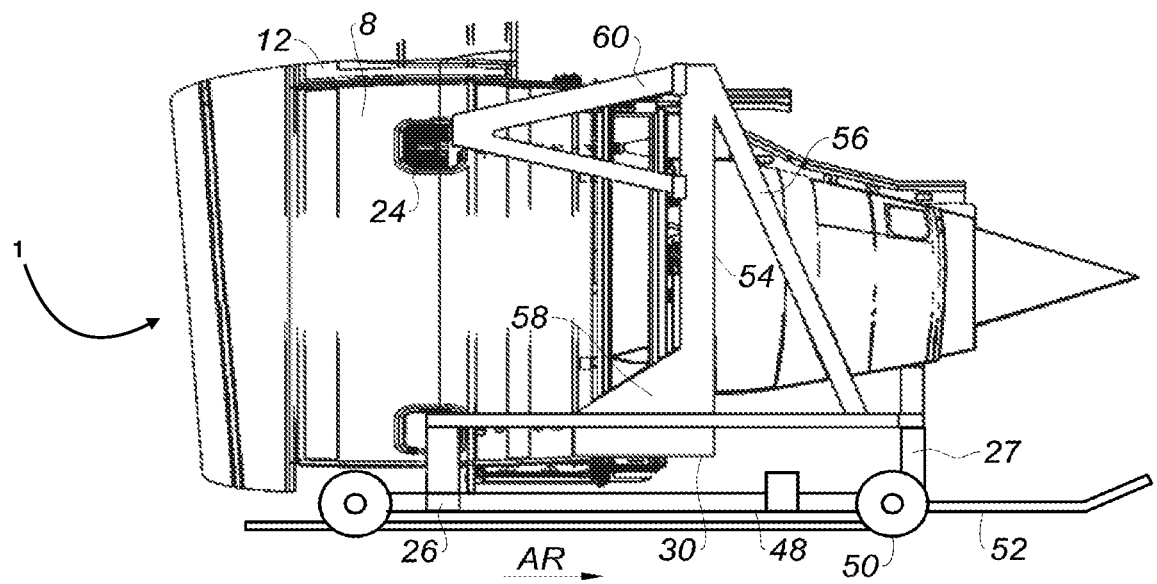
Figure 8:
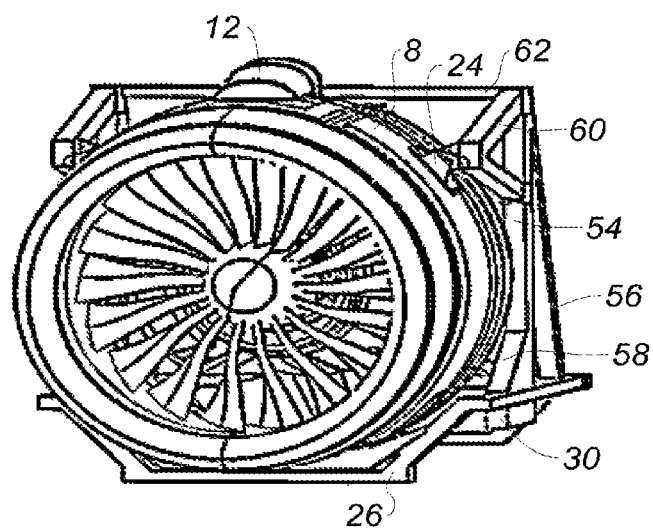

FIG. 7 shows a handling carriage 30 receiving a drive unit 1, which is placed on a displacement platform 48 equipped with wheels 50, and on the rear side indicated by the arrow AR of a drawbar 52.

FIGS. 6, 7, 8 and 9 show the handling carriage 30 comprising on each side a vertical upright 54 located behind the front cowls 8, at the movable rear cowls of the thrust reverser which are disassembled. At this level, the width of the nacelle is reduced, which allows having the vertical uprights 54 slightly behind the total external lateral space requirement of the nacelle given by the front cowls 8 remaining assembled.

Each vertical upright 54 is rigidly fastened to the base of the carriage 30, at the lower portion by a forward-facing triangular gusset 58, coming clearly below the horizontal diameter of the nacelle in order to remain within the lateral space requirement of these uprights, and at the upper portion by a strut 56 inclined backwards.

The two upper ends of the uprights 54 are connected by an upper cross-member 62 coming above the nacelle, which gives the lateral stability to these uprights.

At the upper portion, the front side of each vertical upright 54 includes two forward-facing arms 60, forming a longitudinally elongated triangle with the small base thereof fastened to this upright. The front end of the arms 60 receives a quick fastening of an upper handling clevis 24 installed on the turbojet engine. An upstream transverse lower cross-member 26 is fastened on the lower support points 16. The carriage also comprises a downstream transverse lower cross-member 27.

The significant stiffening in the longitudinal direction of the vertical uprights 54, thanks to the front gussets 58 and the rear struts 56, allows these uprights to withstand the heavy load of the drive unit applied in a cantilever manner to the front end of the arms 60.

Advantageously there is, on the carriage 30, in the chain of elements connecting the upper lifting points 14 to the lower support points 16, a connection allowing taking up clearances due to small differences in geometry between that of the turbojet engine and that of this carriage. In particular, slightly elastic elements, clearances or adjustment ranges can be provided.

As an option, the vertical uprights 54 can also be linked to the base of the carriage 30 by longitudinal pivots, such as the hinged arms 34 shown on the first type of carriage, or be removable.

FIG. 9 shows the minimum passage section 40 desired for the drive unit, which is equivalent to that given by the first type of carriage.

FIG. 10 alternatively shows a carriage 30 not using the lower transverse beam 26, which includes vertical uprights 54 sufficiently rigid to carry the front mass of the drive unit. With this carriage there is no need to provide a lower support point 16 on the turbojet engine.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A drive unit comprising:
a motor being a bypass turbojet engine; and
a nacelle comprising outside around an annular flow path of fresh air, from upstream, an air inlet, lateral front cowls, a thrust reverser comprising thrust reverser cascades, and movable rear cowls, wherein:
the lateral front cowls surrounds the thrust reverser cascades of the thrust reverser when the thrust reverser is closed, and the movable rear cowls moves back with the thrust reverser cascades to open the thrust reverser,
the motor includes lifting points forming resistant hooking points intended to receive handling clevises allowing lifting and transporting the drive unit, wherein the lifting points includes two upper lifting points disposed on the motor, each on one side of the motor radially behind the lateral front cowls above a horizontal diameter of the drive unit, and
each lateral front cowl includes a removable hatch that is movable between a closed position in which the removable hatch is flush with respective lateral front cowl and an open position in which the removable hatch opens an access to one of the two upper lifting points, each removable hatch is disposed radially outward of one of the two upper lifting points.

2. The drive unit according to claim 1, wherein the motor includes suspension points to a mast.

3. The drive unit according to claim 1 further comprising a handling clevis fastened on each upper lifting point when the removable hatches are open and the thrust reverser is open.

4. The drive unit according to claim 1, wherein each upper lifting point is disposed in a transverse plane inside an angular sector centered on an axis of the nacelle, the angular sector being comprised between 20 and 40° above the horizontal diameter of the nacelle.

5. The drive unit according to claim 1, wherein the nacelle includes a lower front cowl and the bypass turbojet engine includes two lower support points, each of the two lower support points is disposed radially behind the lower front cowl.

6. A carriage for a drive unit according to claim 1, configured to present, in a transverse direction, a total width less than a maximum width of the drive unit.

7. The carriage according to claim 6 further comprising, on each side, a hinged arm, wherein the hinged arm includes a lower portion connected by a pivot to a base of the carriage, and an upper portion including a bearing point which is fastened on one of the two upper lifting points.

8. The carriage according to claim 7, wherein the hinged arms are dissemblable.

9. The carriage according to claim 6 further comprising, on each side, an upright disposed rearwardly of the lateral front cowls, and the upright is connected, in an upper portion, to one of the two upper lifting points.

10. The carriage according to claim 9, wherein each upright includes, rearward in a longitudinal direction, a strut bearing on a base of the carriage behind the upright.

11. The carriage according to claim 9, wherein each upright includes, forward in a longitudinal direction in the upper portion, arms extended forward and connected, at front ends thereof to one of the two upper lifting points.

12. The carriage according to claim 9, wherein the uprights are dissemblable.

13. The carriage according to claim 6 further comprising an upstream transport transverse lower cross-member, wherein:
the nacelle of the drive unit includes a lower front cowl and the bypass turbojet engine includes two lower support points, each of the two lower support points is disposed radially behind the lower front cowl, and
the upstream transport transverse lower cross-member is fastened under the two lower support points of the motor.

14. The carriage according to claim 6 further comprising a plurality of bearing points and a connection, wherein:
the nacelle of the drive unit includes a lower front cowl and the bypass turbojet engine includes two lower support points, each of the two lower support points is disposed radially behind the lower front cowl, the bearing points are for the two upper lifting points and for the two lower support points, and the connection is between the bearing points for the two upper lifting points and the bearing points for the two lower support points, wherein the connection takes up clearances due to differences in geometry between geometry of the motor and geometry of the carriage.

15. A motor transport assembly comprising the drive unit according to claim 1 and a carriage for the drive unit, wherein the carriage is configured to present, in a transverse direction, a total width less than a maximum width of the drive unit.

\* \* \* \* \*